(12) United States Patent
    Song

(10) Patent No.: US 8,223,635 B2
(45) Date of Patent: Jul. 17, 2012

(54) METROPOLITAN AREA NETWORK RESOURCE CONTROL SYSTEM AND METHOD, ACCESS RESOURCE ADMISSION AND CONTROL DEVICE

(75) Inventor: Jun Song, Shenzhen (CN)

(73) Assignee: ZTE Corporation (CN)

( * ) Notice: Subject to any disclaimer, the term of this patent is extended or adjusted under 35 U.S.C. 154(b) by 368 days.

(21) Appl. No.: 12/664,725

(22) PCT Filed: Apr. 28, 2008

(86) PCT No.: PCT/CN2008/070826
§ 371 (c)(1),
(2), (4) Date: Dec. 15, 2009

(87) PCT Pub. No.: WO2008/154828
PCT Pub. Date: Dec. 24, 2008

(65) Prior Publication Data
US 2010/0189125 A1    Jul. 29, 2010

(30) Foreign Application Priority Data
Jun. 19, 2007    (CN) .......................... 2007 1 0111515

(51) Int. Cl.
   *H04J 3/16*        (2006.01)
(52) U.S. Cl. ........................................ 370/229; 370/468
(58) Field of Classification Search ............... 370/229, 370/230, 329, 400, 464, 468
   See application file for complete search history.

(56) References Cited

U.S. PATENT DOCUMENTS

| | | | | |
|---|---|---|---|---|
| 7,602,711 B2* | 10/2009 | Liu | ............... | 370/230 |
| 7,647,406 B2* | 1/2010 | Liu | ............... | 709/226 |
| 7,693,054 B2* | 4/2010 | Liu | ............... | 370/230 |
| 7,809,002 B2* | 10/2010 | Das et al. | ............... | 370/395.42 |
| 7,885,262 B2* | 2/2011 | Chen et al. | ............... | 370/392 |
| 7,889,648 B2* | 2/2011 | Zheng | ............... | 370/230 |
| 2007/0070891 A1* | 3/2007 | Zheng | ............... | 370/229 |

FOREIGN PATENT DOCUMENTS

| | | |
|---|---|---|
| CN | 1747400 A | 3/2006 |
| CN | 1747467 A | 3/2006 |
| CN | 1925419 A | 3/2007 |
| CN | 1941740 A | 4/2007 |
| CN | 1863149 A | 12/2009 |

* cited by examiner

*Primary Examiner* — Kerri Rose
(74) *Attorney, Agent, or Firm* — Brooks Kushman P.C.

(57) ABSTRACT

A metropolitan area network (MAN) resource control system, method and Access-Resource and Admission Control Function (A-RACF) device are disclosed, wherein, the A-RACF device comprises a MAN resource and policy control function (RPCF) module. The MAN network device comprises a MAN resource control enforcement function (RCEF) module. The system is connected via the MAN RPC module with the MAN RCEF module which needs to be controlled to control the QoS of the MAN resource. The MAN RPC module is used to make a MAN resource control strategy and generate the QoS policy. The MAN RCEF module is used to execute the QoS control according to the QoS policy sent by the A-RACF device.

11 Claims, 2 Drawing Sheets

METROPOLITAN AREA NETWORK RESOURCE CONTROL SYSTEM AND METHOD, ACCESS RESOURCE ADMISSION AND CONTROL DEVICE

TECHNICAL FIELD

The present invention relates to the service-based resource control system in the data network in the NGN (Next Generation Network), and more specifically, to a metropolitan area network resource control system and method, access resource admission and control device.

BACKGROUND OF THE INVENTION

The TISPAN standard organization of the ETSI (European Telecommunication Standard Institution) defines the RACS (Resource Admission and Control Subsystem) framework which controls the resource in the NGN access network according to the demands of the application services to meet the transmission QoS (Quality of Service) requirement by the application services. The RACS framework comprises two function entities which are respectively the SPDF device (service-based policy and decision function) and the A-RACF device (access-resource admission and control function). The SPDF device makes policy and decision according to the application service requirements and controls the boundary gateway function (BGF) device. The A-RACF device controls the admission and resource QoS control for the access network. So far, the RACS framework only supports controlling the two-layer access network rather than the MAN (three-layer network), thus it cannot really provide the QoS required by the application services. The requirement for the MAN resource control is one of the urgent issues to be addressed listed by TISPAN.

SUMMARY OF THE INVENTION

The present invention provides a system and a method for controlling resource in a MAN, and a A-RACF device as well to solve the problem that the present RACS system cannot control the MAN, so as to make the RACS system able to control the QoS of the resource in the MAN.

In order to solve the above problem, the present invention provides a system for controlling resource in a MAN. The system comprises a A-RACF device which controls a MAN network device. Said A-RACF comprises a MAN Resource and Policy Control Function RPCF module, and said MAN network device comprises a MAN Resource Control Enforcement Function RCEF module, said MAN RPCF module connects with said MAN RCEF module to be controlled in order to control a QoS of the resource in the MAN;

Said MAN RPCF module is used to make a decision for MAN resource control and generate a QoS policy;

Said MAN RCEF module is used to control the QoS according to said QoS policy sent by said A-RACF device.

Furthermore, in the above system, said A-RACF device interacts with said MAN RCEF module via the control interface.

Furthermore, in the above system, said MAN RPCF module makes a decision for MAN resource control according to the resource requirement by the application services and the condition of the resource in the MAN and makes the QoS policy.

The present invention also offers an A-RACF device with the capability of the MAN resource and policy control, said A-RACF device is used to control the admission of the access network and QoS of the resource in the access network, and QoS of the resource in the MAN as well.

The present invention also provides a method for controlling resource in a MAN, which comprises the following steps:

n1, an A-RACF device performs MAN resource and policy control, sends a policy initiation message of the MAN to a MAN network device to control QoS of the resource in the MAN;

n2, the MAN network device enforces the policy sent by said A-RACF device, receives said MAN policy initiation message sent by said A-RACF device, and controls the QoS of the resource in the MAN.

Furthermore, the above method might also comprise, in said step n2, said MAN network device returns an enforcement result to said A-RACF device.

Furthermore, the above method might also further comprise the following steps before said step n1:

a1, after a call initiation message triggers a resource reservation, an application function layer sends a resource reservation request message to a SPDF device;

a2, said SPDF device checks validation of the resource reservation request message and performs a corresponding verification, and then sends the resource reservation request to a corresponding A-RACF device;

a3, said A-RACF device researches for the user's information, sends a policy initiation message of an access network to an access network RCEF module to perform an access network admission control and resource reservation;

a4, said A-RCEF module returns an enforcement result to said A-RACF device; if it reports to the A-RACF device that the access network resource reservation is successful, proceed to said step n1.

Furthermore, the above method also further comprise the following steps after said step n2, d, said SPDF device judges whether the resource reservation is successful according to the status of resource reservation fed back by said A-RACF device, and proceed to step e if yes;

e, said SPDF device checks whether it needs to reserve the resource at the BGF device, and proceed to step f if yes, otherwise proceed to step h;

f, said SPDF device sends the resource control message to the BGF device to reserve the resource; said BGF device feeds back the status of resource reservation to said SPDF device;

h, said SPDF device sends the status of resource reservation to the AF layer.

Furthermore, said method might also comprise, in said step a4, if it reports to the A-RACF device that the access network resource reservation fails, proceed to said step d.

Furthermore, the above method also comprises, in said step a1, said resource reservation request message comprises the information associated with a calling party; said call initiation message comprises a message of the INVITE in SIP; in said step a3, said access network policy initiation message comprises information associated with the QoS, and information whether charging is performed; in said step n1, said MAN policy initiation message comprises the information associated with QoS, and information whether charging is performed.

Furthermore, the above method might also comprise, in said step h, if the resource reservation at said BGF device fails, then said SPDF device notifies said AF layer of the failed reservation, and further instructing said A-RACF device to release the reserved resource.

Compared with the prior art, the present invention makes the A-RACF device able to control the QoS of the resource for the MAN device by adding the MAN RPCF module, thus to make the RACS system can control the MAN resource and QoS.

PREFERRED EMBODIMENTS OF THE PRESENT INVENTION

The embodiments of the present invention will be described in further detail in combination with the accompanying figures.

By adding the MAN RPC function device in the A-RACF device, the method for controlling the MAN resource in accordance with an embodiment of the present invention makes the A-RACF device can control not only the admission of the access network and the QoS of the resource in the access network but also the QoS of the resource for the MAN network device, and the A-RACF finally makes a decision according to the result of resource reservation of the access network and the MAN, thus the RACS can control the QoS of the resource in the MAN, it is specified as follows:

n1, the A-RACF device sends the MAN policy initiation message to the MAN network device (also referred to as the data device or data network device) to control the resource in the MAN;

Said A-RACF device has the function of controlling the MAN resource and strategy, to make a decision of MAN resource control, generate the QoS policy and send the policy initiation message of the MAN.

n2, the MAN network device receives said MAN policy initiation message sent by said A-RACF device to control the QoS of the resource in the MAN.

Said MAN network device has the function of MAN resource control enforcement, which controls the QoS of the MAN resource according to said MAN policy initiation message sent by said A-RACF device.

Figure 1:
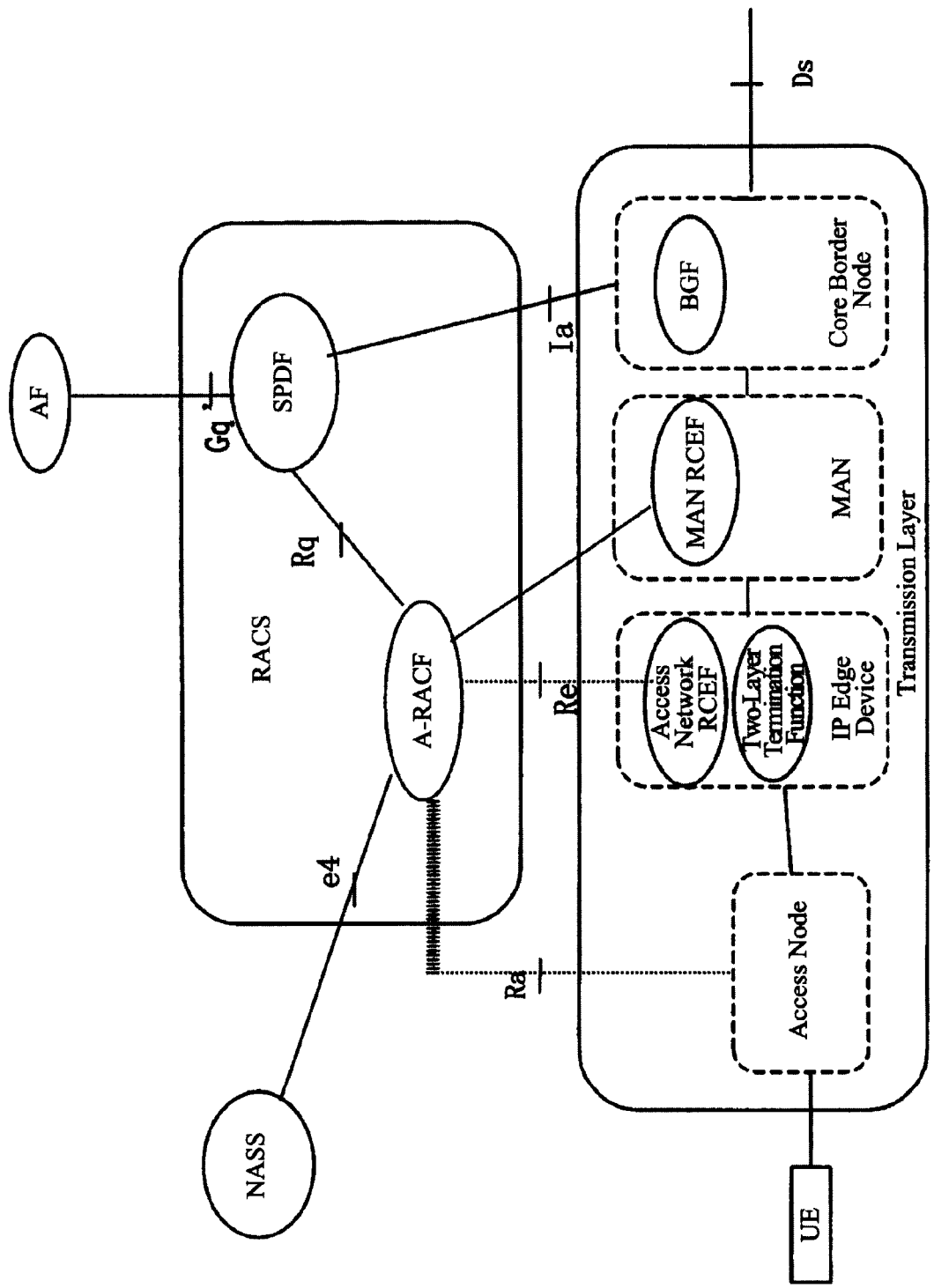
FIG. 1 is the structural block of the MAN resource control system in accordance with an embodiment of the present invention.

As shown in FIG. 1, the MAN resource control system in accordance with an embodiment of the present invention mainly comprises the A-RACF device and the SPDF device, wherein The SPDF device is used to make the policy and decision according to the requirements of the AF, and control the BGF;

The A-RACF device is used to control the admission of the access network and the QoS of the resource in the access network, and control the QoS of the resource in the MAN as well.

Wherein, a MAN RPC function module is added in the A-RACF device, and the MAN RPC function module makes the MAN resource control policy according to the resource requirements by the AF and the status of the resource in the MAN to make the QoS policy and send it to the MAN network device;

Meanwhile, the RCEF (M) (MAN resource control enforcement function) module is added in the MAN network device to be controlled, and this RCEF (M) module performs the resource QoS control according to the QoS policy sent by the A-RACF device;

The A-RACF device interacts with the RCEF (M) in the MAN network device through the control interface, so as to control the MAN resource and provide the QoS policy (said MAN resource control is reflected in the QoS policy which could include the information of resource reservation).

The present invention will be described in further detail in combination with the examples.

Figure 2:
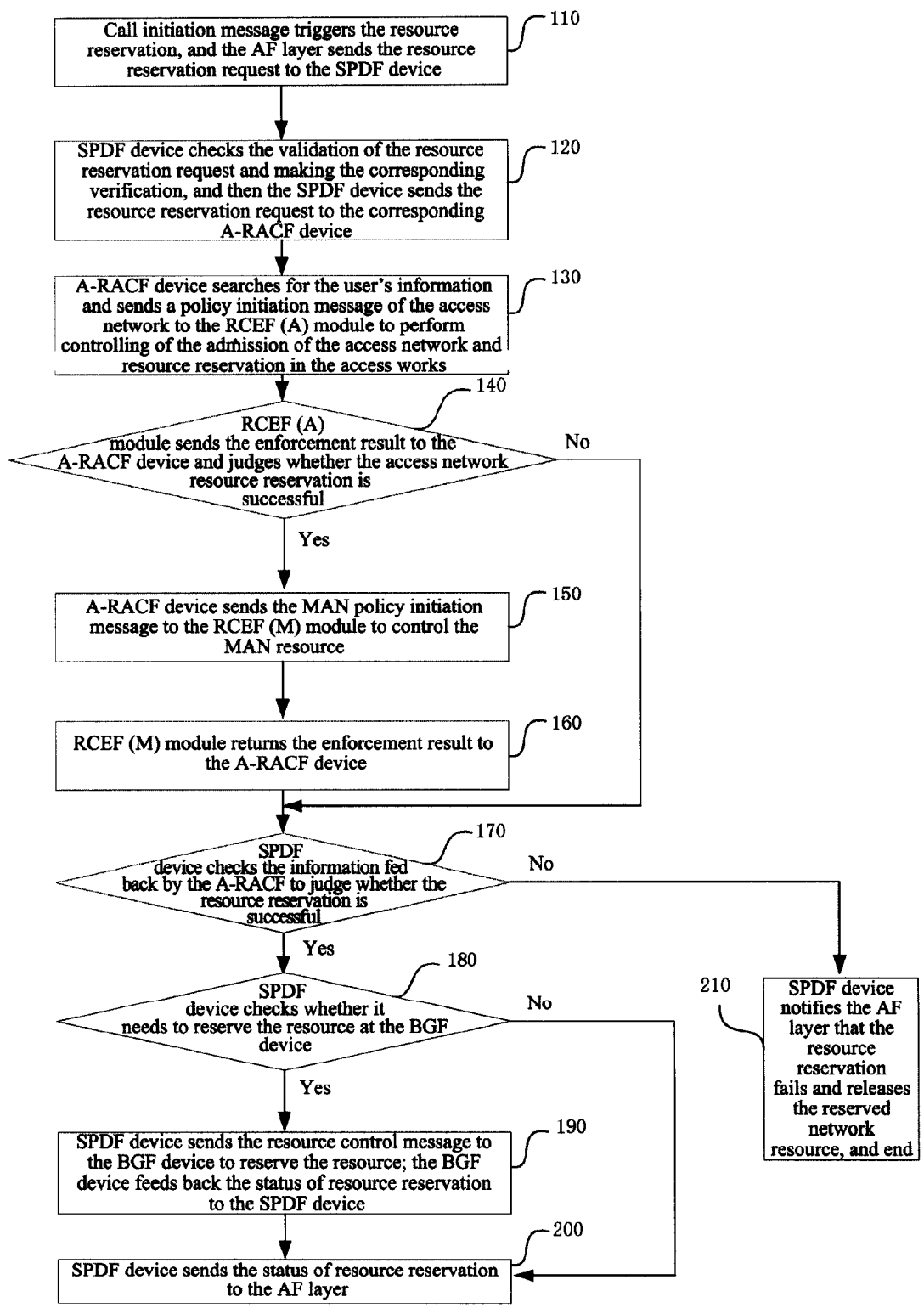
FIG. 2 is a flow chart of the MAN resource control method in accordance with an embodiment of the present invention

FIG. 2 describes a flow chart of the MAN resource control method in accordance with an embodiment of the present invention.

The resource control is triggered by the AF (Application Function) layer which is used for the service that meets the QoS requirement.

The main procedure of the resource control is as follows:

S110, the call initiation message triggers the resource reservation, and the AF layer sends the resource reservation request to the SPDF device;

The call initiation message comprises the message of INVITE, in the SIP protocol, and after the AF layer receives this kind of messages, it reserves the resource.

The resource reservation request comprises the information associated with the calling party.

S120, the SPDF device checks the validation of the resource reservation request and making the corresponding verification, and then the SPDF device sends the resource reservation request to the corresponding A-RACF device;

S130, the A-RACF device searches for the user's information and sends the access network policy initiation message to the RCEF (A) (Access network resource control enforcement function) module to perform the admission control for the access network and resource reservation;

The A-RACF device searches for the user's information, and if there is no such information, it sends a request to the network attachment subsystem (NASS).

The access network policy initiation message comprises the QoS related information, the information of charging or not.

S140, the RCEF (A) module performs the access network admission control and resource reservation according to the access network policy initiation message and sends the enforcement result to the A-RACF device; if it reports to the A-RACF device that the access network resource reservation is successful, proceed to S150, otherwise, proceed to S170;

S150, the A-RACF device sends the MAN policy initiation message to the RCEF (M) module to control the MAN resource and the QoS of the resource;

The MAN policy initiation message comprises the QoS related information and the information of charging or not.

S160, the RCEF (M) module controls the QoS of the resource in the MAN, and returns the enforcement result to the A-RACF device;

S170, the SPDF device checks the information fed back by the A-RACF to judge whether the resource reservation is successful, and proceed to S180 if yes; otherwise proceed to S210;

S180, the SPDF device checks whether it needs to reserve the resource at the BGF device, and proceed to S190 if yes; otherwise proceed to S200;

S190, the SPDF device sends the resource control message to the BGF device to reserve the resource; the BGF device feeds back the status of resource reservation to the SPDF device;

S200, the SPDF device sends the status of resource reservation to the AF layer;

S210, the SPDF device notifies the AF layer that the resource reservation fails and releases the reserved network resource, and end;

If the resource reservation at the BGF device fails, the SPDF device not only notifies the AF layer that the resource reservation fails, but also instructs the A-RACF device to release the reserved resource.

The descriptions above are only the preferred embodiments of the present invention, and not the limitation of the scope of the present invention. Changes or alternatives made without difficulties by those skilled in the art according to the present disclosure are all under the scope of the present invention. Therefore, the scope of the present invention is subject to that of the claims.

INDUSTRIAL APPLICABILITY

By adding the MAN RPC function module, the present invention makes the A-RACF device can control the QoS of the resource in the MAN devices, so as to make the RACS system can control the MAN resource and the QoS of the resource, guarantee the development of the services which meet the QoS requirement in the MAN and create value for the operators and users.

What I claim is:

1. A system for controlling resource in a Metropolitan Area Network (MAN), comprising an Access-Resource and Admission Control Function (A-RACF) device for controlling a MAN device, wherein,
    said A-RACF device comprises a MAN Resource and Policy Control Function (RPCF) module;
    said MAN device comprises a MAN Resource Control Enforcement Function (RCEF) module;
    said MAN RPCF module connects with said MAN RCEF module to be controlled in order to control Quality of Service (QoS) of the resource in the MAN;
    said MAN RPCF module is used to make a decision for MAN resource control and generate a QoS policy;
    said MAN RCEF module is used to control the QoS according to said QoS policy sent by said A-RACF device.

2. A system of claim 1, wherein said A-RACF device interacts with said MAN RCEF module via a control interface.

3. A system of claim 1, wherein said MAN RPCF module makes the decision for MAN resource control and generates the QoS policy according to a resource requirement by application services and a status of the resource in the MAN.

4. An Access-Resource and Admission Control Function (A-RACF) device, wherein said A-RACF device has a function for Metropolitan Area Network (MAN) resource and policy control, and said A-RACF device is used to control admission of an access network and Quality of Service (QoS) of resource in the access network, and control QoS of resource in a MAN as well.

5. A method for controlling resource in a Metropolitan Area Network (MAN), comprising the following steps of:
    n1, an Access-Resource and Admission Control Function (A-RACF) device performing MAN resource and policy control, sending a policy initiation message of the MAN to a MAN device to control Quality of Service (QoS) of the resource in the MAN;
    n2, the MAN device enforcing the policy sent by said A-RACF device, receiving said MAN policy initiation message sent by said A-RACF device, and controlling the QoS of the resource in the MAN.

6. A method of claim 5, further comprising:
    in said step n2, said MAN device returning an enforcement result to said A-RACF device.

7. A method of claim 6, further comprising the following steps before step n1:
    a1, after a call initiation message triggers a resource reservation, an application function layer sending a resource reservation request message to a Service-Based Policy and Decision Function (SPDF) device;
    a2, said SPDF device checking validation of the resource reservation request message and performing a corresponding verification, and then sending the resource reservation request to a corresponding A-RACF device;
    a3, said A-RACF device searching for a user's information, sending a policy initiation message of an Access Network (AN) to an AN Resource Control Enforcement Function (RCEF) module to perform AN admission control and resource reservation;
    a4, said AN RCEF module returning an enforcement result to said A-RACF device; if the A-RACF device is informed that the AN resource reservation is successful, proceeding to said step n1.

8. A method of claim 7, further comprising the following steps after said step n2:
    d, said SPDF device judging whether the resource reservation is successful according to a status of the resource reservation fed back by said A-RACF device, and proceeding to step e if yes;
    e, said SPDF device checking whether a resource reservation is required at a Boundary Gateway Function (BGF) device, and proceeding to step f if yes, otherwise proceeding to step h;
    f, said SPDF device sending a resource control message to the BGF device to perform the resource reservation; said BGF device feeding back a status of the resource reservation to said SPDF device;
    h, said SPDF device sending the status of the resource reservation to the application function layer.

9. A method of claim 8, wherein, in said step a4, if the A-RACF device is informed that the AN resource reservation fails, proceed to said step d.

10. A method of claim 7, wherein, in said step a1, said resource reservation request message comprises information associated with a calling party; said call initiation message comprises a message of INVITE in Session Initiation Protocol; in said step a3, said AN policy initiation message comprises information associated with QoS and information whether charging is performed; in said step n1, said MAN policy initiation message comprises information associated with the QoS and information whether charging is performed.

11. A method of claim 8, further comprising:
    in said step h, if the resource reservation at said BGF device fails, then said SPDF device notifying said application function layer of the failure of the resource reservation, and further instructing said A-RACF device to release the reserved resource.

* * * * *